United States Patent
Jadczak et al.

(10) Patent No.: US 8,646,978 B2
(45) Date of Patent: Feb. 11, 2014

(54) UNCOUPLING SYSTEM FOR AN AIRCRAFT TURBOJET ENGINE ROTARY SHAFT

(75) Inventors: Edouard Joseph Jadczak, Le Mee sur Seine (FR); Cedric Magret, Paris (FR); Pierrick Ollivier, Brunoy (FR); Arnaud Fabrice Quenardel, Combs la Ville (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/575,218

(22) PCT Filed: Jan. 12, 2011

(86) PCT No.: PCT/FR2011/050056
§ 371 (c)(1),
(2), (4) Date: Sep. 13, 2012

(87) PCT Pub. No.: WO2011/092411
PCT Pub. Date: Aug. 4, 2011

(65) Prior Publication Data
US 2013/0022448 A1    Jan. 24, 2013

(30) Foreign Application Priority Data
Jan. 28, 2010    (FR) ..................................... 10 50573

(51) Int. Cl.
*F16C 27/00*    (2006.01)
*F16C 43/00*    (2006.01)

(52) U.S. Cl.
USPC ............. 384/99; 384/535; 384/537; 384/581; 384/585

(58) Field of Classification Search
USPC ........... 384/99, 535, 537, 584, 585, 503, 506, 384/564, 536, 581, 582; 415/110, 111, 112, 415/113, 142, 170.1, 229
See application file for complete search history.

(56) References Cited

U.S. PATENT DOCUMENTS

| | | | | |
|---|---|---|---|---|
| 4,952,076 | A | * | 8/1990 | Wiley et al. ..................... 384/99 |
| 5,791,789 | A | | 8/1998 | Van Duyn et al. |
| 6,082,959 | A | * | 7/2000 | Van Duyn ......................... 415/9 |

(Continued)

FOREIGN PATENT DOCUMENTS

| | | |
|---|---|---|
| EP | 1 013 896 | 6/2000 |
| EP | 1 344 896 | 9/2003 |

(Continued)

OTHER PUBLICATIONS

International Search Report Issued May 11, 2011 in PCT/FR11/50056 Filed Jan. 12, 2011.

*Primary Examiner* — Phillip A Johnson
(74) *Attorney, Agent, or Firm* — Oblon, Spivak, McClelland, Maier & Neustadt, L.L.P.

(57) ABSTRACT

A decoupling system for a rotary shaft of an aircraft turbojet, the decoupling system including: a rolling bearing including rolling elements inserted between a first ring fastened to a stationary bearing support and a second ring mounted in a mounting chamber fastened to a rotary shaft; a transmission mechanism transmitting rotary torque from the rotary shaft to the second ring; a mechanism allowing the second ring to move radially relative to the mounting chamber when a static force associated with an unbalance affecting the rotary shaft exceeds a predetermined threshold; and a plurality of leak-tight flexible bags interposed between the second ring and the mounting chamber and each including a heterogeneous structure including a porous capillary solid matrix and an associated liquid relative to which the matrix is lyophobic.

9 Claims, 4 Drawing Sheets

(56) References Cited

U.S. PATENT DOCUMENTS

| | | |
|---|---|---|
| 6,331,078 B1 | 12/2001 | Van Duyn |
| 6,491,497 B1 * | 12/2002 | Allmon et al. ............... 416/174 |
| 7,909,514 B2 * | 3/2011 | Plona ........................... 384/499 |
| 2003/0182926 A1 | 10/2003 | Plona et al. |
| 2005/0220384 A1 | 10/2005 | Plona |
| 2009/0103849 A1 * | 4/2009 | Maguire ...................... 384/624 |
| 2009/0139201 A1 | 6/2009 | Storace |

FOREIGN PATENT DOCUMENTS

| | | |
|---|---|---|
| EP | 2 065 569 | 6/2009 |
| FR | 2 841 592 | 1/2004 |
| WO | 93 22575 | 11/1993 |

\* cited by examiner

US 8,646,978 B2

UNCOUPLING SYSTEM FOR AN AIRCRAFT TURBOJET ENGINE ROTARY SHAFT

BACKGROUND OF THE INVENTION

The present invention relates to a rotary shaft of an aircraft turbojet, which shaft is supported in rotation by rolling bearings. The invention relates more particularly to a system enabling such a rotary shaft to be decoupled in the event of it being subjected to a large unbalance.

A two-spool bypass turbojet has two rotors, namely a low-pressure rotor and a high-pressure rotor, which rotors are supported by rolling bearings. Typically, the low-pressure rotor is supported by two rolling bearings at the front (referred to herein as "bearing 1" and "bearing 2") and by a rolling bearing at the rear. These bearings need to be able to withstand the axial and radial loads of the turbojet.

In such a turbojet, the breaking of a fan blade (e.g. as a result of ingesting a bird) gives rise to an unbalance on the low-pressure shaft in the plane of the fan. In such a situation, large loads associated with the resulting unbalance are transmitted to the structures of the turbojet, firstly via the bearing 1 that supports the shaft close to the fan, and secondly as a result of contacts between the fan blades and the casing that surrounds them. These loads must therefore be taken into account when designing the turbojet. Reducing them makes it possible to reduce the weight of the turbojet.

In order to achieve this, it is known to install a decoupling system for the bearing 1, and also to increase the clearance between the tips of the fan blades and the casing surrounding them so as to reduce considerably the loads that are transmitted to the structures in the event of a large unbalance on the low-pressure shaft. Typically, a decoupling system is in the form of fuse bolts or columns that are rated to break at a certain load, thereby eliminating the connection between the low-pressure shaft and the stationary support for the bearing 1 in the event of a large unbalance on the low-pressure shaft. This reduces the resonant frequency of the suspension of the fan in the operating range of the low-pressure shaft, thereby reducing loads at high speed. Having recourse to a decoupling system is nevertheless effective only if contacts between the fan blades and the casing that surrounds them are reduced, and that requires a large amount of clearance between those parts.

Furthermore, the drop in the frequency of the suspension mode of the fan as a result of the fuse bolts breaking also gives rise to a change in the nature of that suspension mode, which tends to deform the low-pressure shaft rather than the stationary support of the bearing 1. That gives rise to significant bending of the low-pressure shaft under the high-pressure rotor of the turbojet. In particular, contacts may occur between the low-pressure shaft and the high-pressure shaft, which contacts increase the risk of the low-pressure shaft breaking.

A known way of limiting such inter-shaft contacts during the deceleration that results from a fan blade breaking is to add a decoupling system to the bearing 2. That decoupling system, which is rated to break after the decoupling system of bearing 1, serves to release radial clearance at the bearing 2 in order to limit inter-shaft contacts. A mechanical abutment situated at bearing 2 serves advantageously to limit the radial movements of the low-pressure shaft after the decoupling system of this bearing 2 has broken.

Nevertheless, such a solution with two decoupling systems presents the drawback whereby the increase in clearance at bearing 2 as a result of breakage of the decoupling system allows the low-pressure rotor to start orbiting during stages of autorotation operation ("windmilling") and contributes to increasing vibration levels at low speed.

OBJECT AND SUMMARY OF THE INVENTION

A main object of the present invention is thus to mitigate such drawbacks by proposing a decoupling system for a rotary shaft that makes it possible, while using only a single device, to limit inter-shaft contacts while ensuring that the rotary shaft is held axially and while reducing loads and vibration during stages of windmilling operation.

This object is achieved by a decoupling system for a rotary shaft of an aircraft turbojet the system comprising: a rolling bearing having a plurality of rolling elements inserted between first and second rings, the first ring being fastened to a stationary bearing support of the turbojet and the second ring being mounted in an annular mounting chamber fastened to a rotary shaft of the turbojet; transmission means for transmitting rotary torque from the rotary shaft to the second ring of the bearing; and means for radially centering the second ring of the bearing relative to the mounting chamber so long as a static force associated with an unbalance affecting the rotary shaft does not exceed a predetermined threshold, and for allowing the second ring of the bearing to move radially relative to the mounting chamber when a static force associated with an unbalance affecting the rotary shaft exceeds said predetermined threshold; the decoupling system being characterized in that it further includes a plurality of leaktight flexible bags interposed between the second ring of the bearing and the mounting chamber around the entire circumference thereof, each bag containing a heterogeneous structure constituted by a porous capillary solid matrix and an associated liquid relative to which the matrix is lyophobic.

When an unbalance affects the rotary shaft, the resulting force on the parts of the rotary shaft is static in the rotating frame of reference associated with the shaft. The bags containing the heterogeneous structure are of constant volume. Thus, the static force that results from the unbalance passes in full via these bags. So long as the unbalance does not exceed the predetermined threshold, the annular mounting chamber, the bags, and the rolling elements of the bearing move together in identical manner. When the static force associated with the unbalance exceeds the predetermined threshold, the second ring of the bearing moves radially relative to the annular mounting chamber. These movements cause the bags to become compressed, thereby giving rise, above a certain compression threshold, to the liquid penetrating into the capillary network of the solid matrix of the heterogeneous structure (this operation takes place almost instantaneously and is isothermal). The volume of the bags then decreases suddenly, thereby releasing clearance between the rotary shaft and the second ring of the bearing. As soon as the pressure exerted on the bags drops below the predetermined threshold, the heterogeneous structure has the feature of expanding spontaneously, thereby making it possible to return to the prior situation.

Such a system is particularly advantageous for decoupling the low-pressure shaft of a turbojet of the two-spool, bypass type. In this configuration, the system is applied to bearing 2 and the force needed for compressing the bags is rated so that in the presence of a residual unbalance on the low-pressure shaft that is considered as normal (i.e. that does not impede operation of the turbojet), the liquid does not penetrate into the capillary network of the solid matrix of the heterogeneous structure. In contrast, in the event of a fan blade being lost, the sudden compression of the bags takes place immediately after decoupling of the bearing 1. When the low-pressure rotor decelerates, the force on the bearing 2 decreases and drops below the limit force, thereby causing the heterogeneous structure contained in the bags to expand. This causes the low-pressure rotor to be re-centered within the bearing 2 and thereby reduces the level of vibration induced by the low-pressure rotor orbiting at low speed and during stages in which windmilling operation is taking place.

Thus, the decoupling system of the invention makes it possible, in the event of a fan blade breaking, to limit inter-shaft contacts and to reduce the levels of vibration during the deceleration stage that follows the unbalance. Furthermore, since the bearing remains intact, it continues to perform its function of holding the rotary shaft axially. No additional device is required to perform this function in the event of a large unbalance. This simplifies the architecture and saves weight, thereby improving performance.

The second ring of the bearing may include a fuse shoulder fastened to the mounting chamber and enabling the second ring of the bearing to be centered radially relative to the mounting chamber so long as a static force associated with an unbalance affecting the rotary shaft does not exceed the predetermined threshold, and suitable for breaking when a static force associated with an unbalance affecting the rotary shaft exceeds the predetermined threshold so as to allow the second ring of the bearing to move radially relative to the mounting chamber.

Alternatively, the second ring of the bearing may include an axial flange fastened to a corresponding flange of the mounting chamber, the flanges forming a flexible connection allowing the second ring of the bearing to move radially relative to the mounting chamber.

Furthermore, the second ring of the bearing may include a plurality of lugs co-operating with corresponding teeth of the mounting chamber to enable rotary torque to be transmitted from the rotary shaft to the second ring of the bearing.

The mounting chamber is preferably made up of two distinct portions. Furthermore, the mounting chamber may be an interference fit on the rotary shaft and may be held axially in position thereon by a nut.

The invention also provides an aircraft turbojet including at least one decoupling system as defined above.

BRIEF DESCRIPTION OF THE DRAWINGS

Other characteristics and advantages of the present invention appear from the following description given with reference to the accompanying drawings that show embodiments having no limiting character. In the figures.

DETAILED DESCRIPTION OF EMBODIMENTS

Figure 1:
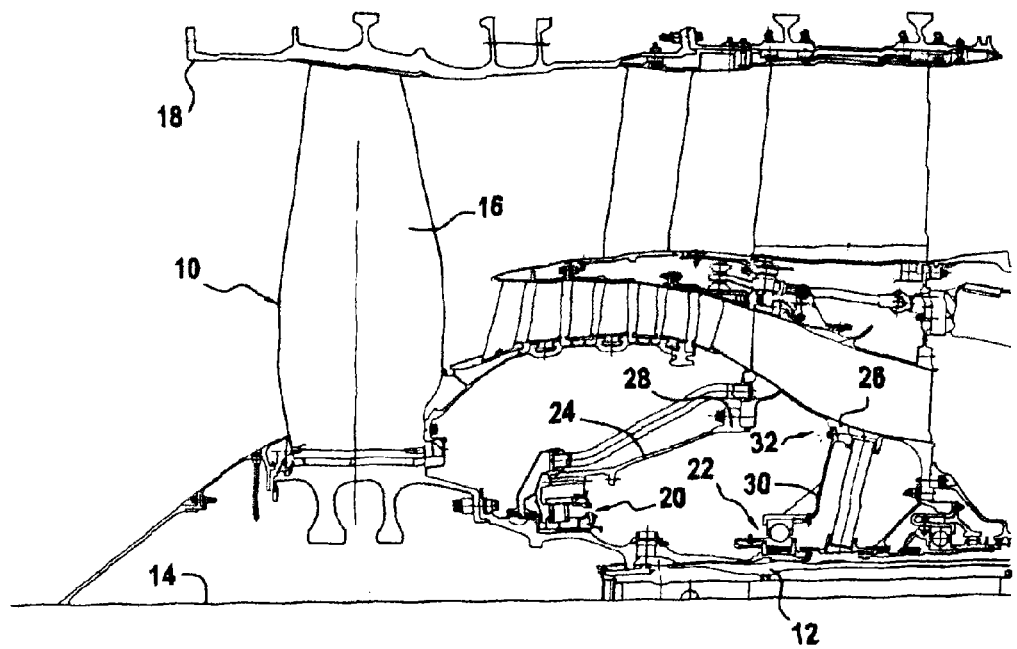
FIG. 1 is a general diagrammatic view showing the preferred location for the decoupling system of the invention.

FIG. 1 is a fragmentary view in longitudinal section of a low-pressure rotor 10 of a turbojet of the two-spool bypass type. The low-pressure rotor comprises in particular a low-pressure shaft 12 centered on the longitudinal axis 14 of the turbojet and carrying a plurality of fan blades 16 at its upstream end. An annular casing 18 centered on the longitudinal axis 14 surrounds the fan blades.

The low-pressure shaft 12 is supported in rotation by a front bearing 20 (also referred to as "bearing 1") of the roller bearing type, and by a rear bearing 22 (also referred to as "bearing 2") of the ball bearing type.

More precisely, the front bearing 20 is supported by a front bearing support 24 that is connected to a stationary structure 26 of the turbojet (intermediate casing) by means of fuse bolts 28. These fuse bolts constitute a first system for decoupling the low-pressure shaft: they are rated to break under a predetermined load corresponding to a large unbalance on the low-pressure shaft (as typically occurs on losing a fan blade 16) in order to eliminate the connection between the low-pressure shaft and the stationary structure 26 of the turbojet. Naturally, other bearing-level decoupling systems may be envisaged.

Likewise, the rear bearing 22 is supported by a rear bearing support 30 that is also connected to the stationary structure 26 of the turbojet by means of bolts 32. A second system for decoupling the low-pressure shaft is also provided at this rear bearing, this system being a system of the invention.

Figure 3:
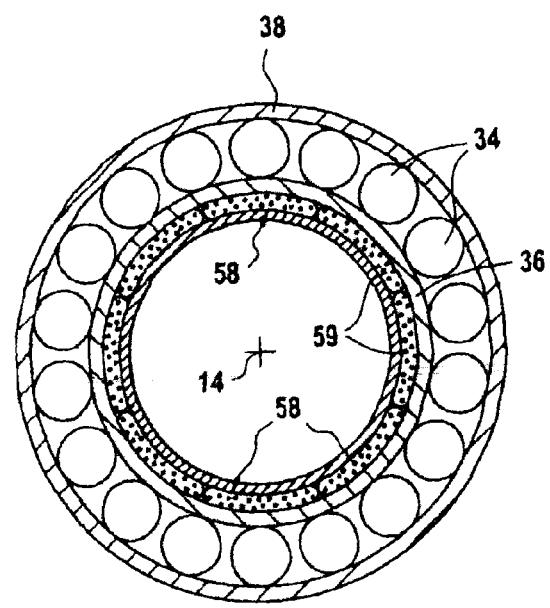
FIG. 3 is a section view on III-III of FIG. 2.
Figure 2:
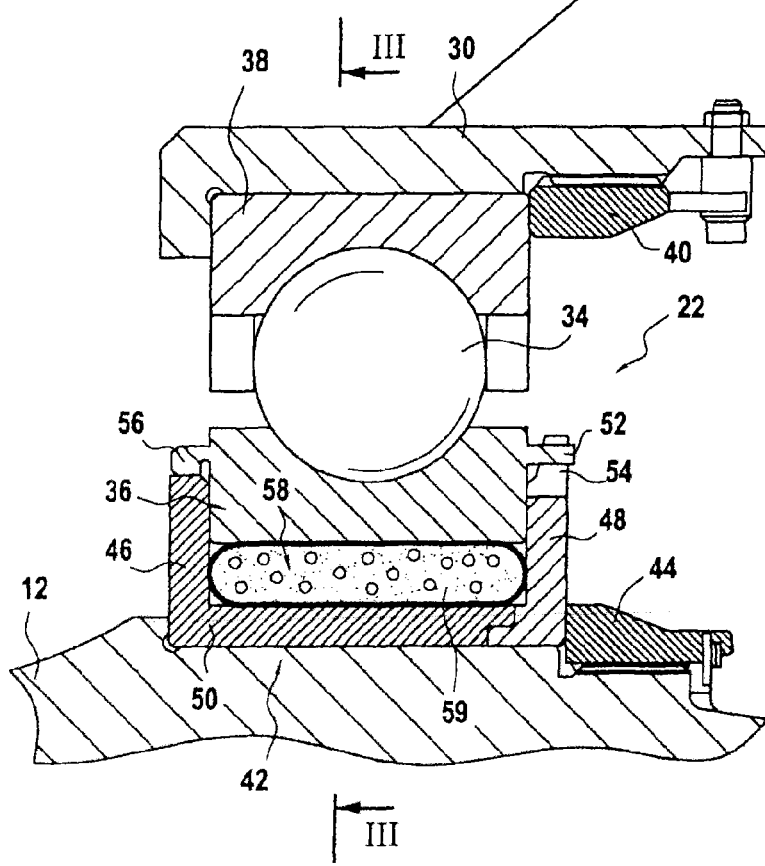
FIG. 2 is a section view of a decoupling system in an embodiment of the invention.

There follows initially a description of a first embodiment of such a decoupling system, given with reference to FIGS. 2 and 3.

The rear bearing 22 has a plurality of balls 34 that are inserted between an inner ring 36 arranged beside the low-pressure shaft 12 and an outer ring 38 arranged beside the rear bearing support 30, these rings defining raceways for the balls. More precisely, the outer ring is fastened to the rear bearing support 30 by means of a nut 40.

The inner ring is mounted in an annular mounting chamber 42 that is an interference fit on the low-pressure shaft and that is axially fastened thereon by a nut 44. The mounting chamber 42 presents an upstream wall 46 that is axially spaced apart from a downstream wall 48 by a bottom wall 50.

In order to enable rotary torque to be transmitted from the low-pressure shaft to the inner ring of the rear bearing, the ring includes a plurality of lugs 52 co-operating with corresponding teeth 54 formed at the free end of the downstream wall 48 of the mounting chamber. Other rotary torque transmission means could naturally be envisaged.

Furthermore, the inner ring 36 of the rear bearing also has a fuse shoulder 56 that is centered on the free end of the upstream wall 46 of the mounting chamber. This fuse shoulder enables the inner ring to be centered radially on the mounting chamber in normal operation, i.e. so long as a static force associated with an unbalance affecting the rotary shaft does not exceed a predetermined threshold. The fuse shoulder extends in an axial direction and presents grooving on its inside face suitable for breaking mechanically under a predetermined load (corresponding to a predetermined static force threshold associated with an unbalance affecting the low-pressure shaft). In the event of this predetermined threshold being exceeded, the shoulder 56 breaks, thereby allowing the inner ring of the rear bearing to move radially relative to the mounting chamber 42. The static force threshold is selected so as to cause the shoulder 56 to break immediately after the low-pressure shaft has become decoupled at the front bearing 20.

Still in the invention, a plurality of flexible leaktight bags 58 are interposed between the inner ring 36 of the rear bearing and the mounting chamber 42 over its entire circumference, each bag containing a special heterogeneous structure 59.

As shown in FIG. 2, these bags extend both axially between the upstream and downstream walls 46 and 48 of the mounting chamber, and also radially between the bottom wall 50 of the mounting chamber and the inside surface of the inner ring 36. Furthermore, these bags run on one after another so as to cover the entire circumference of the mounting chamber (FIG. 3). Naturally, it is possible to imagine other configurations for arranging these bags. In particular, they could be arranged as a plurality of layers.

These bags 58 are flexible and leaktight relative to the heterogeneous structure 59 they contain. Such a heterogeneous structure is made up of a porous capillary solid matrix and an associated liquid relative to which the matrix is lyophobic. Other examples of a heterogeneous structure presenting these characteristics are given in international patent application WO 96/18040, the content of which is incorporated herein by reference.

The material constituting the capillary matrix may for example be a compound of silica and chromium, an aluminosilicate, alumina, a porous sodium-borosilicate glass, graphite, etc., and it may present an active surface area of about 700 square meters ($m^2$) to 1500 $m^2$ per gram (g). The associated liquid should then be a polar liquid having the property of not wetting the material constituting the capillary matrix, such as for example water, mercury, gallium, indium, a lead or tin alloy, etc.

Such a heterogeneous structure presents the feature whereby the liquid surrounding the capillary matrix that is lyophobic relative to the liquid cannot spontaneously penetrate into the pores or capillaries, and that such penetration can only be forced, as a result of appropriate compression being exerted on the heterogeneous structure, i.e. on the bag 58 containing it. The pressure threshold that must be crossed in order to obtain such penetration of the liquid into the pores of the capillary matrix is known and predetermined. It is selected so that the compression of the heterogeneous structure in the bags takes place immediately after breakage of the shoulder 56 radially connecting the inner ring 36 of the rear bearing to the mounting chamber 42.

Figure 4:
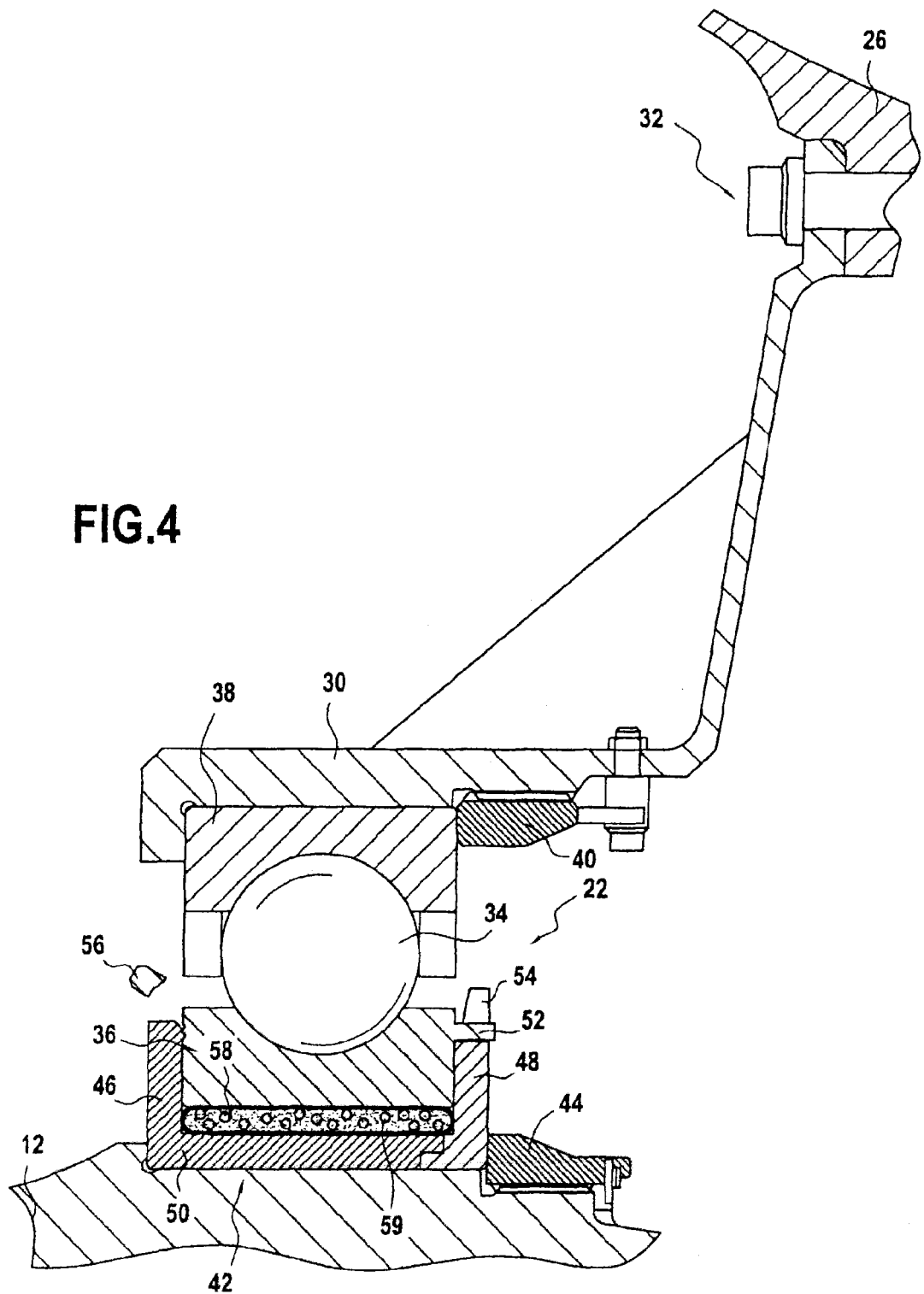
FIG. 4 is a section view of the FIG. 2 system after decoupling.

Thus, when an unbalance affects the low-pressure shaft 12 and when the static force associated with the unbalance remains below the above-mentioned predetermined force threshold, the force passes entirely via the leaktight bags without the volume of these bags being affected. In contrast, when the static force associated with the unbalance exceeds the predetermined static force threshold, the inner bag 36 of the rear bearing decoupled from the mounting chamber 42, thus allowing the inner ring to move radially relative to the chamber. These movements then compress those bags 58 that are situated in register with the unbalance. When the predetermined pressure threshold is exceeded, such compression causes the liquid to penetrate into the capillary network of the solid matrix of the heterogeneous structure (which operation takes place quasi-instantaneously and is isothermal). The volume of the bags 58 thus decreases suddenly, thereby releasing clearance between the low-pressure shaft and the inner ring of the bearing (as shown in FIG. 4).

Furthermore, the capillary matrix of the heterogeneous structure contained in the bags 58 is preferably selected so as to be monoporous such that when the pressure applied to the heterogeneous structure in the compressed bags is released, the structure relaxes spontaneously, thereby making it possible to return to the situation shown in FIGS. 2 and 3.

It should be observed that the variation in the volume of the bags (between their normal state and their compressed state) is directly proportional to the porosity of the material constituting the capillary matrix. It is thus possible to determine the volume of the bags in their compressed state and consequently to determine the clearance that is released between the low-pressure shaft and the inner ring of the rear bearing when a blade is lost.

Figure 5:
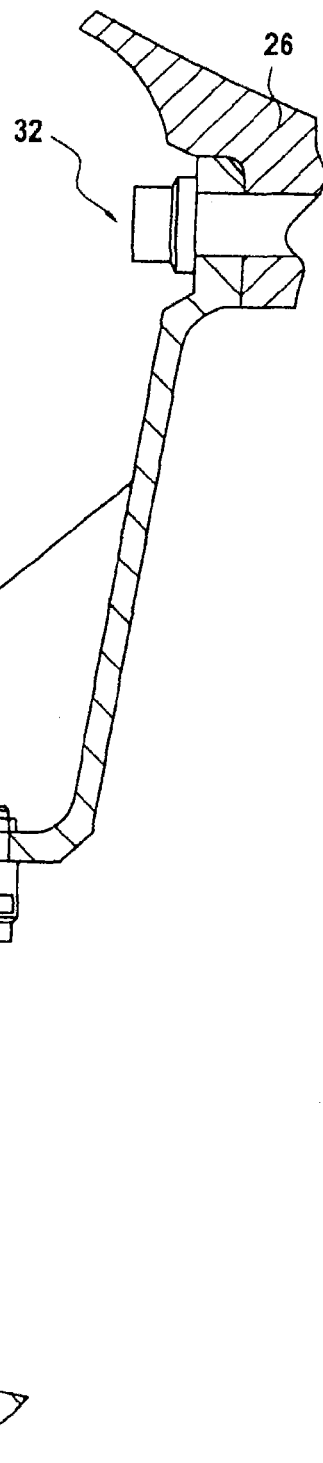
FIG. 5 is a section view of a decoupling system in another embodiment of the invention.

With reference to FIG. 5, there follows a description of a second bearing of the decoupling system of the invention.

This second embodiment differs from the first in particular in that the inner ring 36' of the rear bearing 22' has a flange 60 that extends axially upstream and that is fastened to a corresponding flange 62 of the mounting chamber 42' (this flange 62 extends axially upstream from the end of the upstream wall 46' of the mounting chamber). These flanges 60 and 62 are fastened to each other by means of a nut-and-bolt system 64 and they form a flexible connection system that allows the inner ring to move radially relative to the mounting chamber. This flexible connection 60, 62 also enables the inner ring to be centered radially on the mounting chamber and to take up the axial forces generated by the thrust.

In this second embodiment, since no mechanical breakage occurs in the connection between the inner ring and the mounting chamber in the event of a fan blade being lost, it is necessary to take account of the flexibility of the connection 60, 62 when determining the characteristics of the heterogeneous structure 59 contained in the bags 58.

Various advantageous characteristics common to both of the above-described embodiments are described below.

In one advantageous provision, in order to make the rear bearing 22, 22' easier to assemble, the mounting chamber 42, 42' is made as two distinct portions, namely a first portion formed by the bottom wall 50, 50' and the upstream wall 46, 46', and a second portion formed in particular by the downstream wall 48, 48'.

The mounting chamber is assembled as follows. The first portion of the mounting chamber is installed initially as an interference fit on the low-pressure shaft 12. The flexible bags 58 containing the heterogeneous structure 59 are then positioned over the entire circumference of the mounting chamber and they are held in position with the help of special tooling, and the rear bearing is mounted on the bags from the downstream end. The second portion of the mounting chamber is then mounted from the downstream end and engaged as an interference fit on the low-pressure shaft, and the two portions are held axially by means of the nut 44.

Finally, it should be observed that in order to enable the inner ring of the rear bearing to move radially in the mounting chamber, it is necessary to add a coating on the inside surfaces of the chamber and/or on the inner ring in order to provide a low coefficient of friction between these two parts. By way of example, this coating may be of Teflon®.

The invention claimed is:

1. A decoupling system for a rotary shaft of an aircraft turbojet, the system comprising:
   a rolling bearing including a plurality of rolling elements inserted between first and second rings, the first ring being fastened to a stationary bearing support of the turbojet and the second ring being mounted in an annular mounting chamber fastened to a rotary shaft of the turbojet;
   transmission means for transmitting rotary torque from the rotary shaft to the second ring of the bearing;
   means for radially centering the second ring of the bearing relative to the mounting chamber so long as a static force associated with an unbalance affecting the rotary shaft does not exceed a predetermined threshold, and for allowing the second ring of the bearing to move radially relative to the mounting chamber when a static force associated with an unbalance affecting the rotary shaft exceeds the predetermined threshold; and
   a plurality of leaktight flexible bags interposed between the second ring of the bearing and the mounting chamber around the entire circumference thereof, each bag including a heterogeneous structure including a porous capillary solid matrix and an associated liquid relative to which the matrix is lyophobic.

2. A system according to claim 1, wherein the second ring of the bearing includes a fuse shoulder fastened to the mounting chamber and enabling the second ring of the bearing to be centered radially relative to the mounting chamber so long as a static force associated with an unbalance affecting the rotary shaft does not exceed the predetermined threshold, and configured to break when a static force associated with an unbalance affecting the rotary shaft exceeds the predetermined threshold so as to allow the second ring of the bearing to move radially relative to the mounting chamber.

3. A system according to claim 1, wherein the second ring of the bearing includes an axial flange fastened to a corresponding flange of the mounting chamber, the flanges forming a flexible connection allowing the second ring of the bearing to move radially relative to the mounting chamber.

4. A system according to claim 1, wherein the second ring includes said transmission means, said transmission means includes a plurality of lugs co-operating with corresponding teeth of the mounting chamber to enable the transmission of the rotary torque from the rotary shaft to the second ring of the bearing.

5. A system according to claim 1, wherein the mounting chamber is made up of two distinct portions.

6. A system according to claim 1, wherein the mounting chamber is an interference fit on the rotary shaft and is held axially in position thereon by a nut.

7. A system according to claim 1, wherein the rolling elements of the bearing are balls.

8. A system according to claim 1, wherein the first ring of the bearing is arranged on the outside, while the second ring is arranged on the inside.

9. An aircraft turbojet, comprising at least one decoupling system according to claim 1.

* * * * *